US012738670B2

(12) United States Patent
Nagata

(10) Patent No.: US 12,738,670 B2
(45) Date of Patent: Sep. 15, 2026

(54) ANTENNA RADIATING ELEMENT AND ANTENNA DEVICE

(71) Applicant: Proterial, Ltd., Tokyo (JP)

(72) Inventor: Hajime Nagata, Tokyo (JP)

(73) Assignee: Proterial, Ltd., Tokyo (JP)

( * ) Notice: Subject to any disclaimer, the term of this patent is extended or adjusted under 35 U.S.C. 154(b) by 198 days.

(21) Appl. No.: 18/740,750

(22) Filed: Jun. 12, 2024

(65) Prior Publication Data

US 2024/0421502 A1 Dec. 19, 2024

(30) Foreign Application Priority Data

Jun. 13, 2023 (JP) ................................ 2023-096930

(51) Int. Cl.
*H01Q 21/26* (2006.01)
*H01Q 9/28* (2006.01)
*H01Q 21/20* (2006.01)

(52) U.S. Cl.
CPC ............ *H01Q 21/26* (2013.01); *H01Q 9/285* (2013.01); *H01Q 21/205* (2013.01)

(58) Field of Classification Search
CPC ...... H01Q 21/26; H01Q 21/205; H01Q 9/285; H01Q 1/36; H01Q 15/165; H01Q 19/185
See application file for complete search history.

(56) References Cited

U.S. PATENT DOCUMENTS

2008/0169994 A1* 7/2008 Hasegawa .............. H01Q 1/246 343/834
2013/0106668 A1* 5/2013 Katipally ............... H01Q 21/24 343/797
2022/0173524 A1* 6/2022 Miki ...................... H01Q 21/08
2024/0396210 A1* 11/2024 So ........................... H01Q 3/32

FOREIGN PATENT DOCUMENTS

JP 2004282316 A * 10/2004
JP 2009010471 A 1/2009
KR 101084746 B1 * 11/2011 ............... H01Q 9/26

* cited by examiner

*Primary Examiner* — Seokjin Kim
(74) *Attorney, Agent, or Firm* — David D. Brush; Westman, Champlin & Koehler, P.A.

(57) ABSTRACT

An antenna radiating element includes an antenna portion and a reflector. The antenna portion includes two bow-tie antennas arranged in a cross shape. The reflector includes a tubular portion having a cross-sectional shape, which is a regular octagon, in a cross-section orthogonal to an axial direction, a bottom portion closing one end part in the axial direction of the tubular portion, and an opening portion provided at an end part opposite to the one end part of the tubular portion. The antenna portion is positioned in the vicinity of the opening portion.

8 Claims, 11 Drawing Sheets

ANTENNA RADIATING ELEMENT AND ANTENNA DEVICE

CROSS-REFERENCE TO RELATED APPLICATIONS

The present application claims priority based on Japanese Patent Application No. 2023-096930 filed to Japanese Patent Office on Jun. 13, 2023, and the content of Japanese Patent Application No. 2023-096930 is incorporated by reference in its entirety.

BACKGROUND

The present disclosure relates to an antenna radiating element and an antenna device.

JP 2009-10471 A discloses a bow-tie antenna. When arranged in a cross shape, two bow-tie antennas can be arranged in a space-saving manner as antenna elements having orthogonal polarization.

SUMMARY

FIG. 11 shows an element direction D1, which is a feed direction in a bow-tie antenna 201, and a vertical direction D2 vertical to the element direction D1. In the bow-tie antenna 201, there arises a problem that a difference (hereinafter, called a beam width deviation) between a beam width in the element direction D1 and a beam width in the vertical direction D2 is large.

In one aspect of the present disclosure, it is preferable to provide an antenna radiating element and an antenna device that can suppress a deviation in a beam width.

One aspect of the present disclosure is an antenna radiating element including: an antenna portion including two bow-tie antennas arranged in a cross shape; and a reflector. The reflector includes a tubular portion having a cross-sectional shape, which is a regular octagon, in a cross-section orthogonal to an axial direction, a bottom portion closing one end part in the axial direction of the tubular portion, and an opening portion provided at an end part opposite to the one end part of the tubular portion. The antenna portion is positioned in the vicinity of the opening portion.

The antenna radiating element that is one aspect of the present disclosure can suppress a deviation in a beam width.

BRIEF DESCRIPTION OF THE DRAWINGS

Embodiments of the present disclosure will be described below with reference to the accompanying drawings, in which.

DETAILED DESCRIPTION OF EXEMPLARY EMBODIMENTS

First Embodiment

1. Configuration of Antenna Device 1

A configuration of an antenna device 1 will be described with reference to FIGS. 1A and 1B. The antenna device 1 is used as an antenna device for a mobile phone base station, for example. FIG. 1B omits description of an antenna portion 41 and a reflector 98, which are parts of an antenna radiating element 4.

Figure 1A:
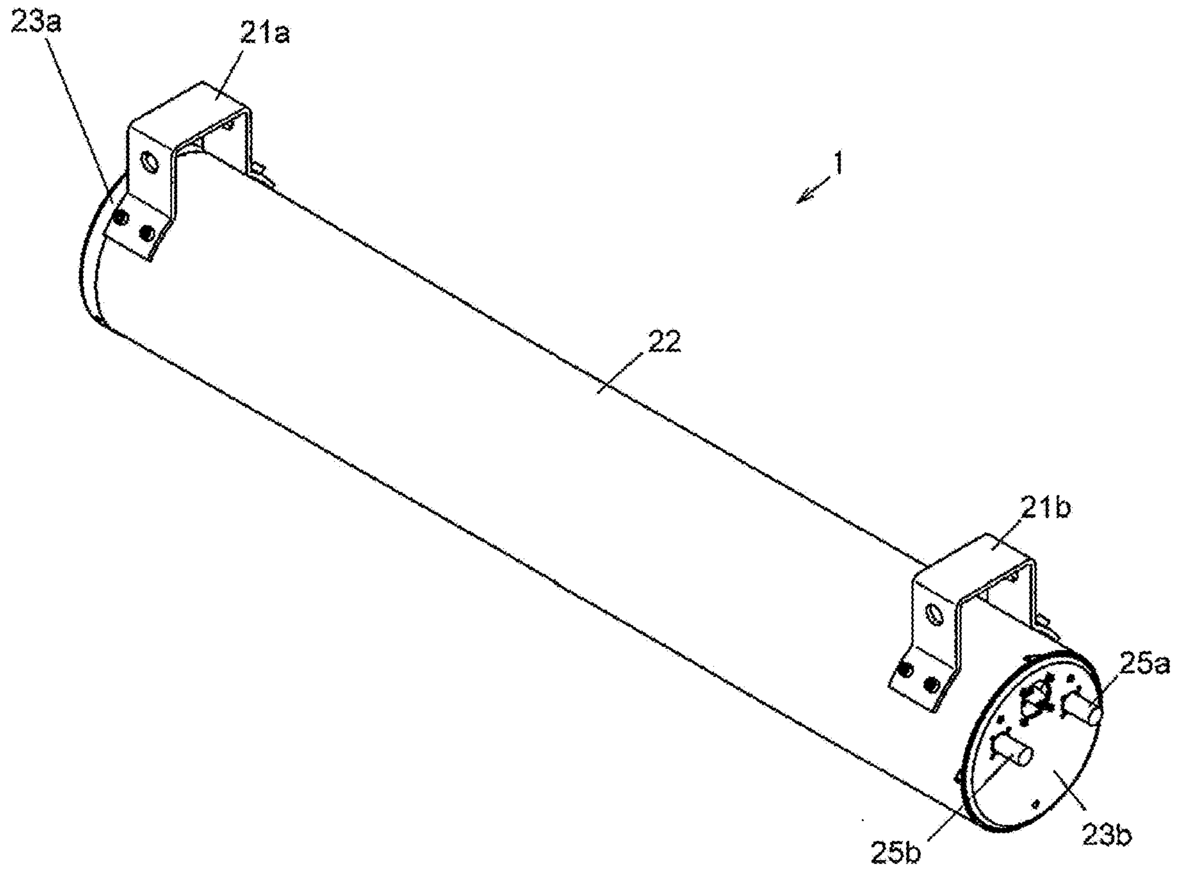
FIG. 1A is a perspective view showing an appearance of an antenna device.
Figure 1B:
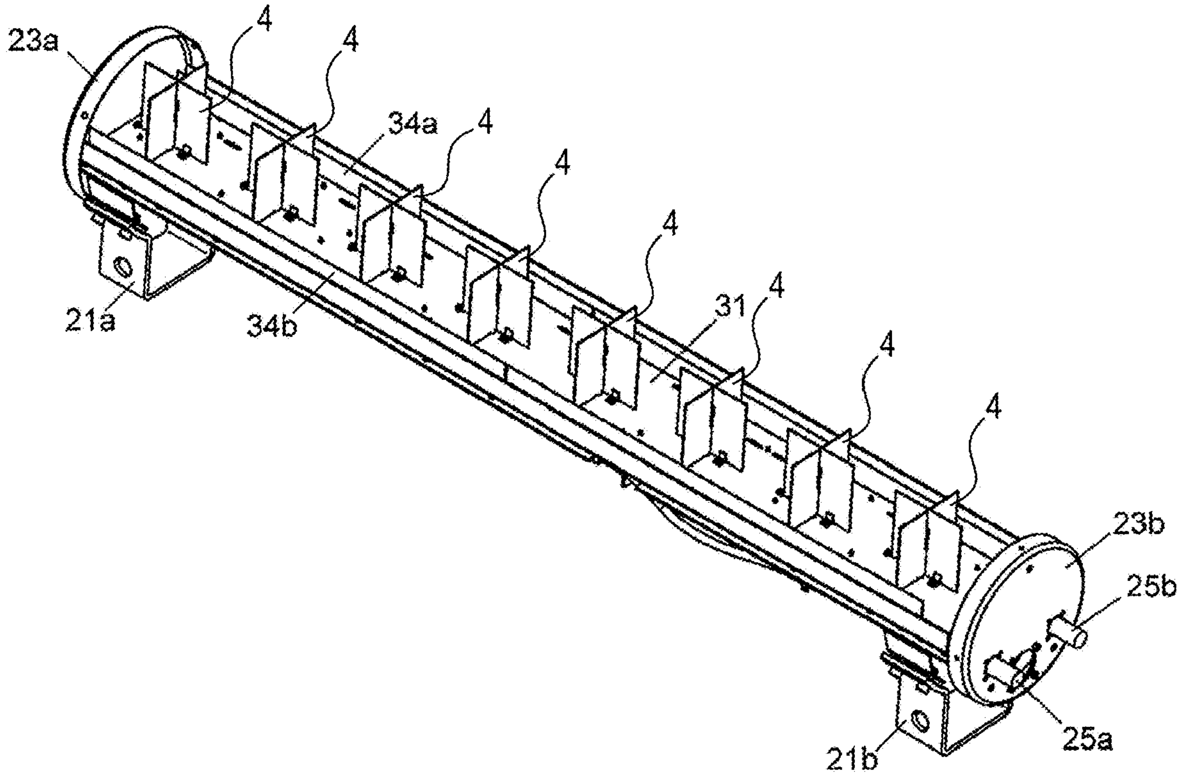
FIG. 1B is a perspective view showing a plurality of antenna radiating elements arrayed inside the antenna device.

As shown in FIG. 1A, the antenna device 1 includes a radome 22 having a cylindrical shape and antenna caps 23*a* and 23*b*. Both ends of the radome 22 are closed by the antenna caps 23*a* and 23*b*.

The antenna device 1 includes fittings 21*a* and 21*b*. The antenna device 1 is attached to an antenna tower or the like with the fittings 21*a* and 21*b* such that a longitudinal direction of the antenna device 1 coincides with the vertical direction.

The antenna device 1 includes coaxial cable adapters 25*a* and 25*b*. The coaxial cable adapters 25*a* and 25*b* function as radio-frequency signal transmission/reception terminals. The coaxial cable adapters 25*a* and 25*b* protrude outward from the antenna cap 23*b*. As shown in FIG. 1B, the antenna device 1 includes a plurality of the antenna radiating elements 4. The plurality of antenna radiating elements 4 are accommodated inside the radome 22.

The antenna device 1 includes a bottom plate 31 inside the radome 22. The plurality of antenna radiating elements 4 are arranged in a row on the bottom plate 31. Both sides in a width direction of the bottom plate 31 are provided with side plates 34*a* and 34*b*, respectively. The width direction is a direction orthogonal to the longitudinal direction of the antenna device 1. The bottom plate 31 has a function as a reflector that reflects electromagnetic waves radiated from the antenna radiating elements 4.

2. Configuration of Antenna Radiating Element 4

Figure 2:
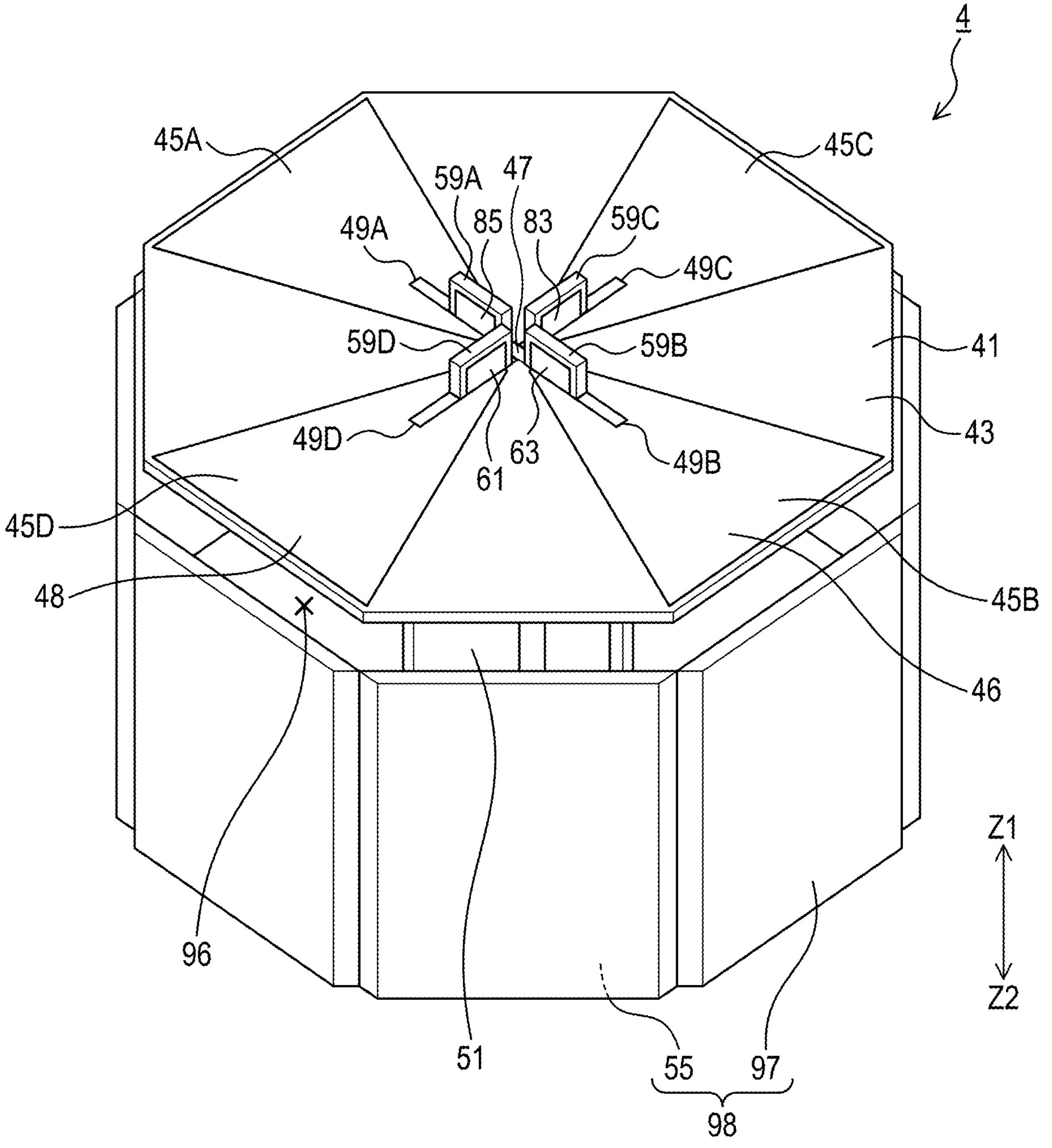
FIG. 2 is a perspective view showing a configuration of the antenna radiating element.
Figure 3:
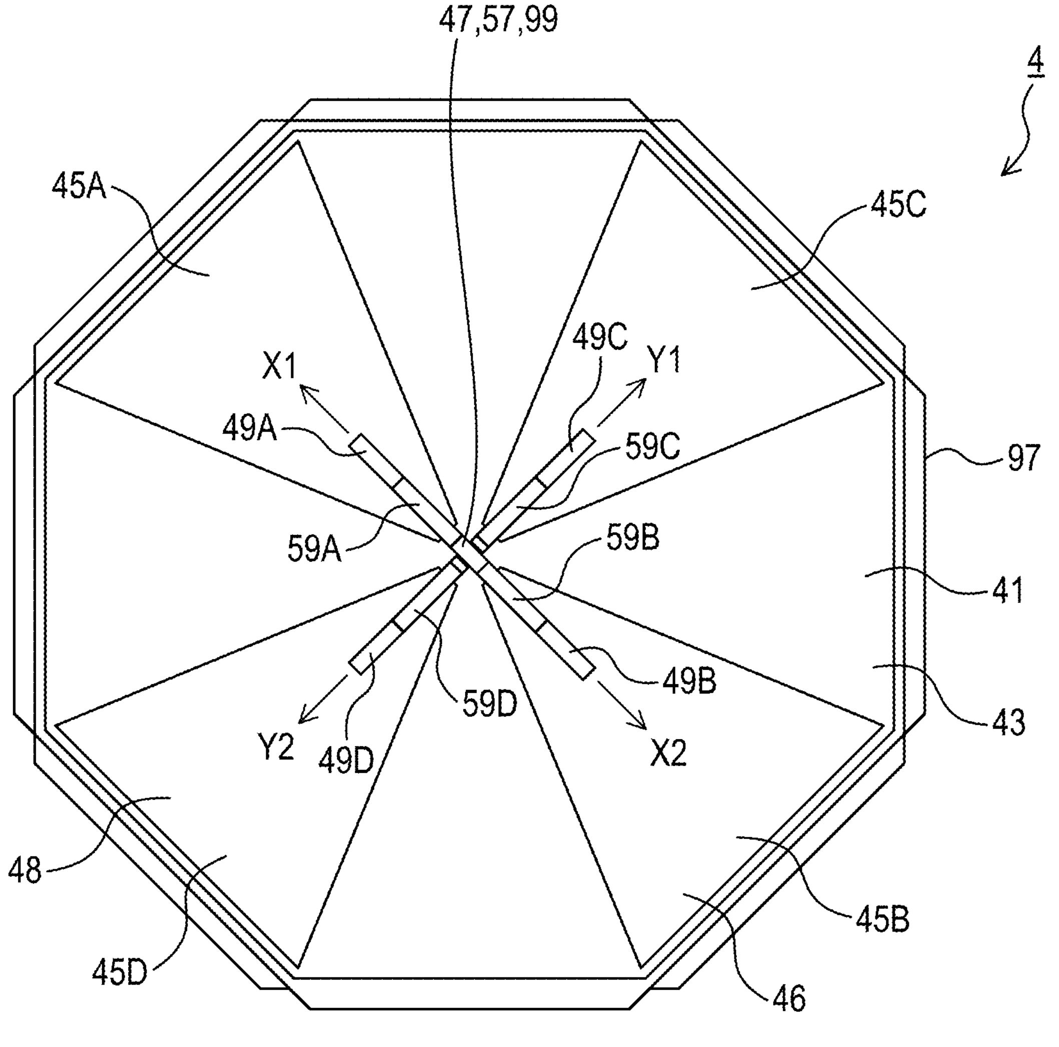
FIG. 3 is an explanatory view showing the antenna radiating element when viewed from a direction Z1.
Figure 4:
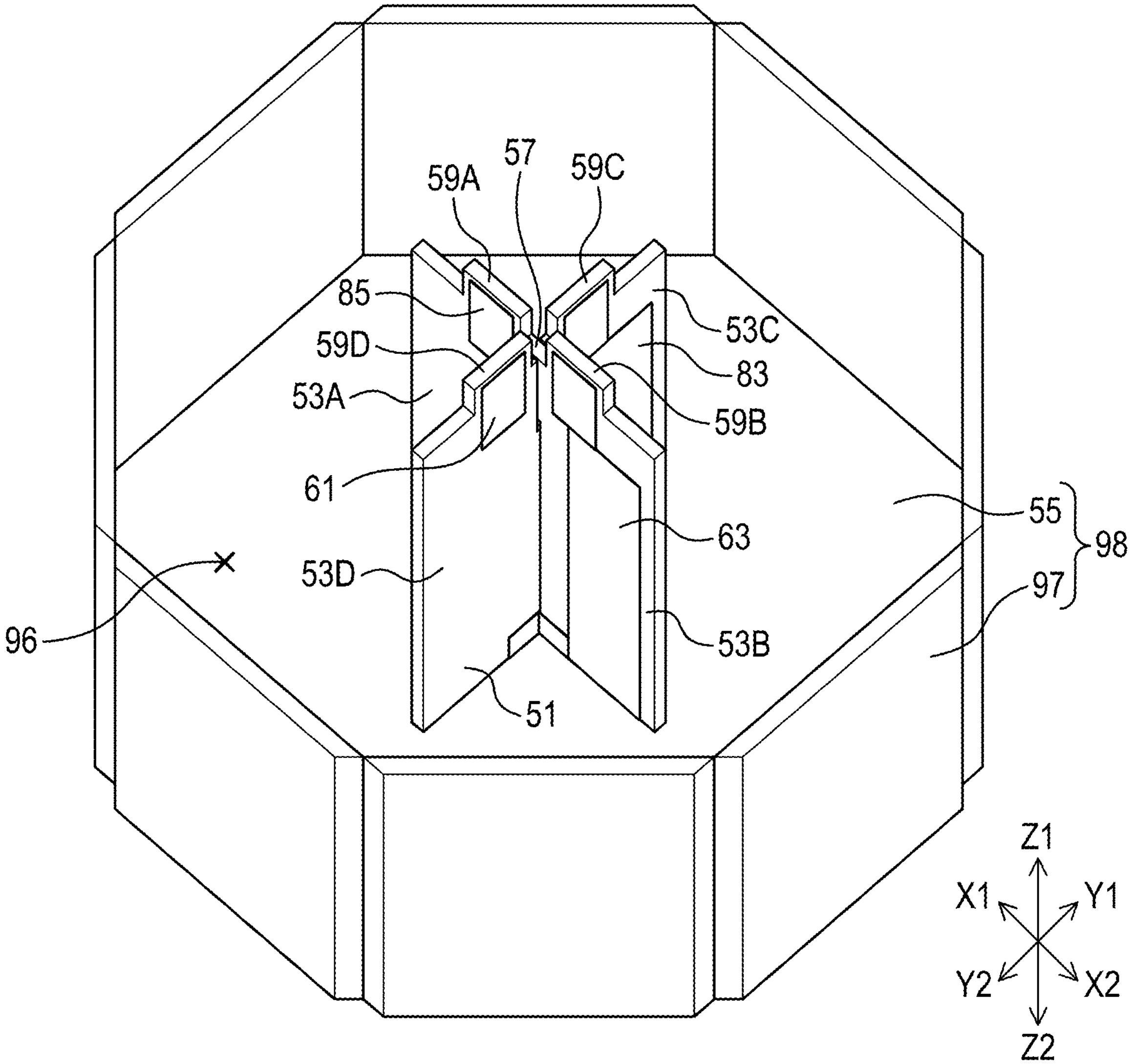
FIG. 4 is a perspective view showing a configuration of the antenna radiating element in a state where the antenna portion is removed.

The configuration of the antenna radiating element 4 will be described with reference to FIGS. 2 to 8. As shown in FIGS. 2 and 3, the antenna radiating element 4 includes the antenna portion 41. The antenna portion 41 includes a board 43 and four radiating elements 45A, 45B, 45C, and 45D. The board 43 is a regular octagonal plate made of a dielectric and/or including a dielectric.

The radiating elements 45A, 45B, 45C, and 45D are conductor patterns formed on a main surface on the side of the direction Z1 shown in FIG. 2 of main surfaces of the board 43. The main surfaces are surfaces having much larger areas than other surfaces in a plate-shaped member. The direction Z1 is parallel to the thickness direction of the board 43.

The radiating elements 45A, 45B, 45C, and 45D are arranged so as to surround a center 47 of the board 43. The center 47 is a center when viewed from the direction Z1. The radiating element 45A extends from the center 47 in a direction X1 shown in FIG. 3. The direction X1 is a direction parallel to the main surfaces of the board 43 and orthogonal to the direction Z1.

The radiating element 45B extends from the center 47 in a direction X2 shown in FIG. 3. The direction X2 is an opposite direction to the direction X1. The radiating element 45C extends from the center 47 in a direction Y1 shown in FIG. 3. The direction Y1 is a direction parallel to the main surfaces of the board 43 and orthogonal to the direction Z1, the direction X1, and the direction X2. The radiating element 45D extends from the center 47 in a direction Y2 shown in FIG. 3. The direction Y2 is an opposite direction to the direction Y1.

Each of the radiating elements 45A, 45B, 45C, and 45D has an isosceles triangle shape. In the isosceles triangle, a vertex in between two sides of equal length is on the center 47 side.

The radiating elements 45A and 45B constitute one bow-tie antenna 46. The radiating elements 45C and 45D constitute one bow-tie antenna 48. The bow-tie antenna 46 and the bow-tie antenna 48 are arranged in a cross shape when viewed from the direction Z1. The center 47 is an intersection of the bow-tie antenna 46 and the bow-tie antenna 48. The directions X1 and X2 are extension directions and feed directions of the bow-tie antenna 46. The directions Y1 and Y2 are extension directions and feed directions of the bow-tie antenna 48.

The antenna portion 41 includes through-holes 49A, 49B, 49C, and 49D. Each of the through-holes 49A, 49B, 49C, and 49D penetrates the antenna portion 41 in the thickness direction. The through-hole 49A is formed at a position on the side of the center 47 in the radiating element 45A. The shape of the through-hole 49A is an elongated shape having a longitudinal direction coinciding with the direction X1.

The through-hole 49B is formed at a position on the side of the center 47 in the radiating element 45B. The shape of the through-hole 49B is an elongated shape having a longitudinal direction coinciding with the direction X2. The through-hole 49C is formed at a position on the side of the center 47 in the radiating element 45C. The shape of the through-hole 49C is an elongated shape having a longitudinal direction coinciding with the direction Y1. The through-hole 49D is formed at a position on the side of the center 47 in the radiating element 45D. The shape of the through-hole 49D is an elongated shape having a longitudinal direction coinciding with the direction Y2.

As shown in FIGS. 2 and 4 to 8, the antenna radiating element 4 includes a dielectric substrate 51. The dielectric substrate 51 is on the side of the direction Z2 with reference to the antenna portion 41. The direction Z2 is an opposite direction to the direction Z1. The dielectric substrate 51 is in contact with the main surface on the side of the direction Z2 of the antenna portion 41. As shown in FIGS. 4 to 7, the dielectric substrate 51 includes unit substrates 53A, 53B, 53C, and 53D.

The unit substrate 53A is a plate-shape portion extending in the direction X1 from a center 57 of the dielectric substrate 51 when viewed from the direction Z1. The center 57 is a center when viewed from the direction Z1. When viewed from the direction Z1, the center 57 coincides with the center 47 of the antenna portion 41. The unit substrate 53A extends from the center 57 to the outer peripheral side of the antenna portion 41 when viewed from the direction Z1.

The thickness direction of the unit substrate 53A is parallel to the direction Y1 and the direction Y2. The basic form of the unit substrate 53A is a rectangle. The unit substrate 53A includes a protrusion portion 59A on the side of the direction Z1 and the side of the center 57. The protrusion portion 59A protrudes in the direction Z1. The shape of the protrusion portion 59A is a rectangle.

The unit substrate 53B is a plate-shape portion extending in the direction X2 from the center 57 when viewed from the direction Z1. The unit substrate 53B extends from the center 57 to the outer peripheral side of the antenna portion 41 when viewed from the direction Z1. The thickness direction of the unit substrate 53B is parallel to the direction Y1 and the direction Y2. The basic form of the unit substrate 53B is a rectangle. The unit substrate 53B includes a protrusion portion 59B on the side of the direction Z1 and the side of the center 57. The protrusion portion 59B protrudes in the direction Z1. The shape of the protrusion portion 59B is a rectangle.

The unit substrate 53C is a plate-shape portion extending in the direction Y1 from the center 57 when viewed from the direction Z1. The unit substrate 53C extends from the center 57 to the outer peripheral side of the antenna portion 41 when viewed from the direction Z1. The thickness direction of the unit substrate 53C is parallel to the direction X1 and the direction X2. The basic form of the unit substrate 53C is a rectangle. The unit substrate 53C includes a protrusion portion 59C on the side of the direction Z1 and the side of the center 57. The protrusion portion 59C protrudes in the direction Z1. The shape of the protrusion portion 59C is a rectangle.

The unit substrate 53D is a plate-shape portion extending in the direction Y2 from the center 57 when viewed from the direction Z1. The unit substrate 53D extends from the center 57 to the outer peripheral side of the antenna portion 41 when viewed from the direction Z1. The thickness direction of the unit substrate 53D is parallel to the direction X1 and the direction X2. The basic form of the unit substrate 53D is a rectangle. The unit substrate 53D includes a protrusion portion 59D on the side of the direction Z1 and the side of the center 57. The protrusion portion 59D protrudes in the direction Z1. The shape of the protrusion portion 59D is a rectangle.

As shown in FIGS. 4 to 7, when viewed from the direction Z1, the unit substrate 53A and the unit substrate 53B are aligned on a straight line passing through the center 57 and parallel to the directions X1 and X2. When viewed from the direction Z1, the unit substrate 53C and the unit substrate 53D are aligned on a straight line passing through the center 57 and parallel to the directions Y1 and Y2.

As shown in FIGS. 4 to 8, the antenna radiating element 4 includes a bottom portion 55. The dielectric substrate 51 is connected to the bottom portion 55. The bottom portion 55 is a regular octagonal plate member. The size of the bottom portion 55 is equal to the size of the board 43. The bottom portion 55 is connected to side surfaces on the side of the direction Z2 in the unit substrates 53A to 53D. The side surface is a surface between one main surface and the other main surface on the opposite side of the surfaces of the plate-shaped member. The thickness direction of the bottom portion 55 is parallel to the directions Z1 and Z2.

Figure 6:
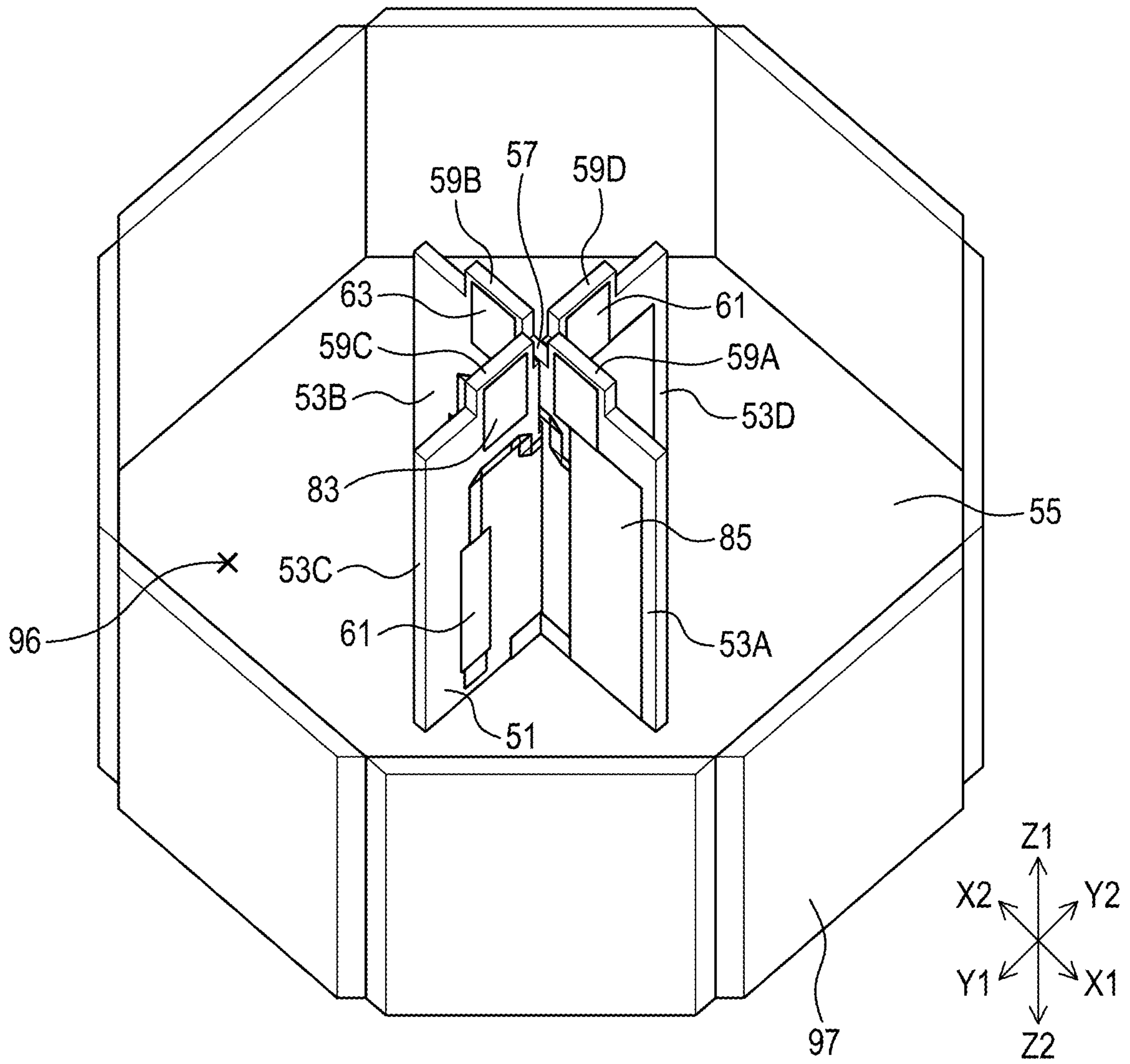
FIG. 6 is a perspective view showing a configuration of the antenna radiating element in a state where the antenna portion is removed.
Figure 7:
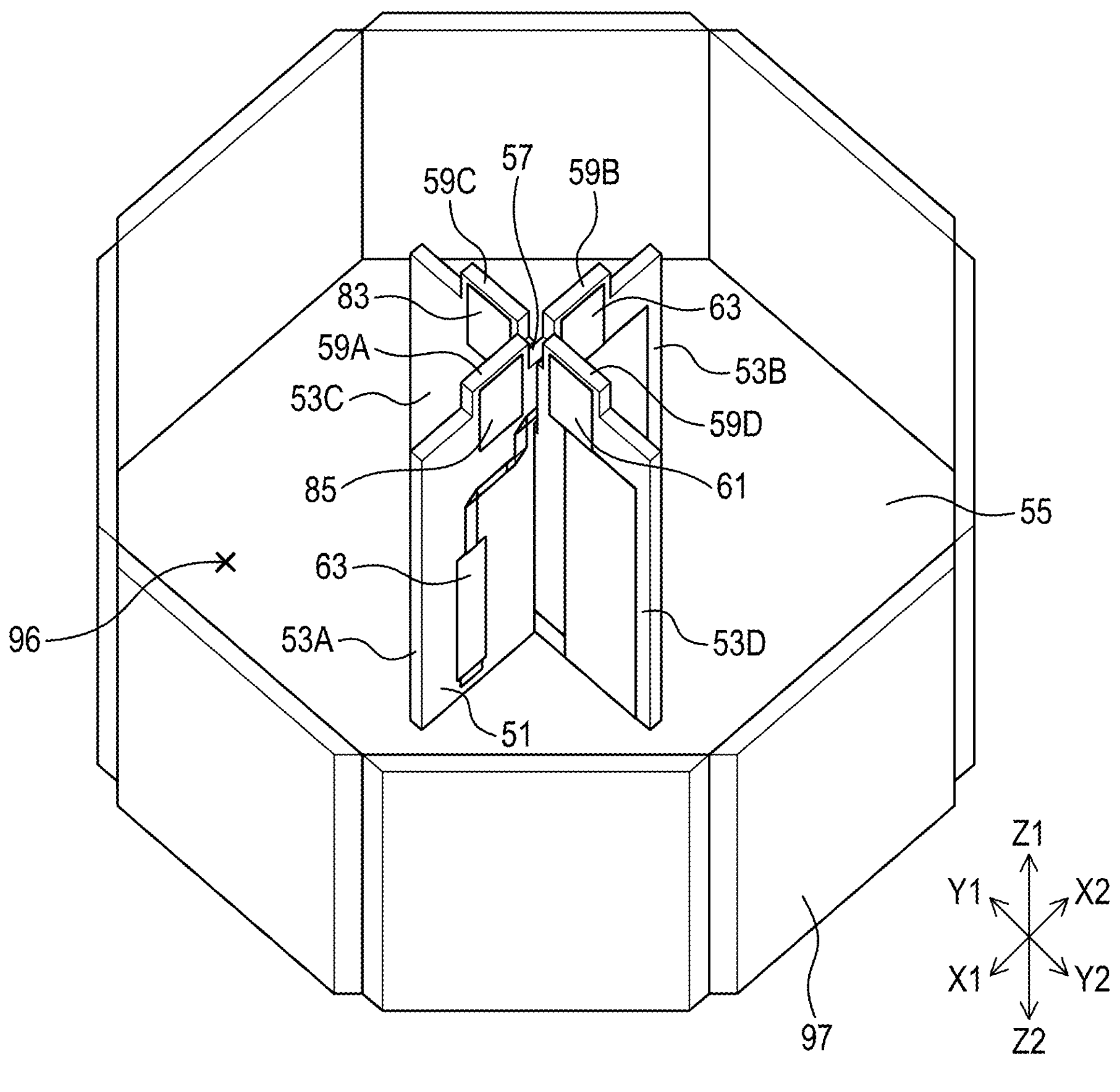
FIG. 7 is a perspective view showing a configuration of the antenna radiating element in a state where the antenna portion is removed.

As shown in FIGS. 6 and 7, the dielectric substrate 51 is provided with a conductor pattern 61 that is continuous. The conductor pattern 61 is a conductor pattern for signal transmission. The conductor pattern 61 reaches the surface of the protrusion portion 59D via the surface of the unit substrate 53C and the surface of the unit substrate 53D.

Figure 5:
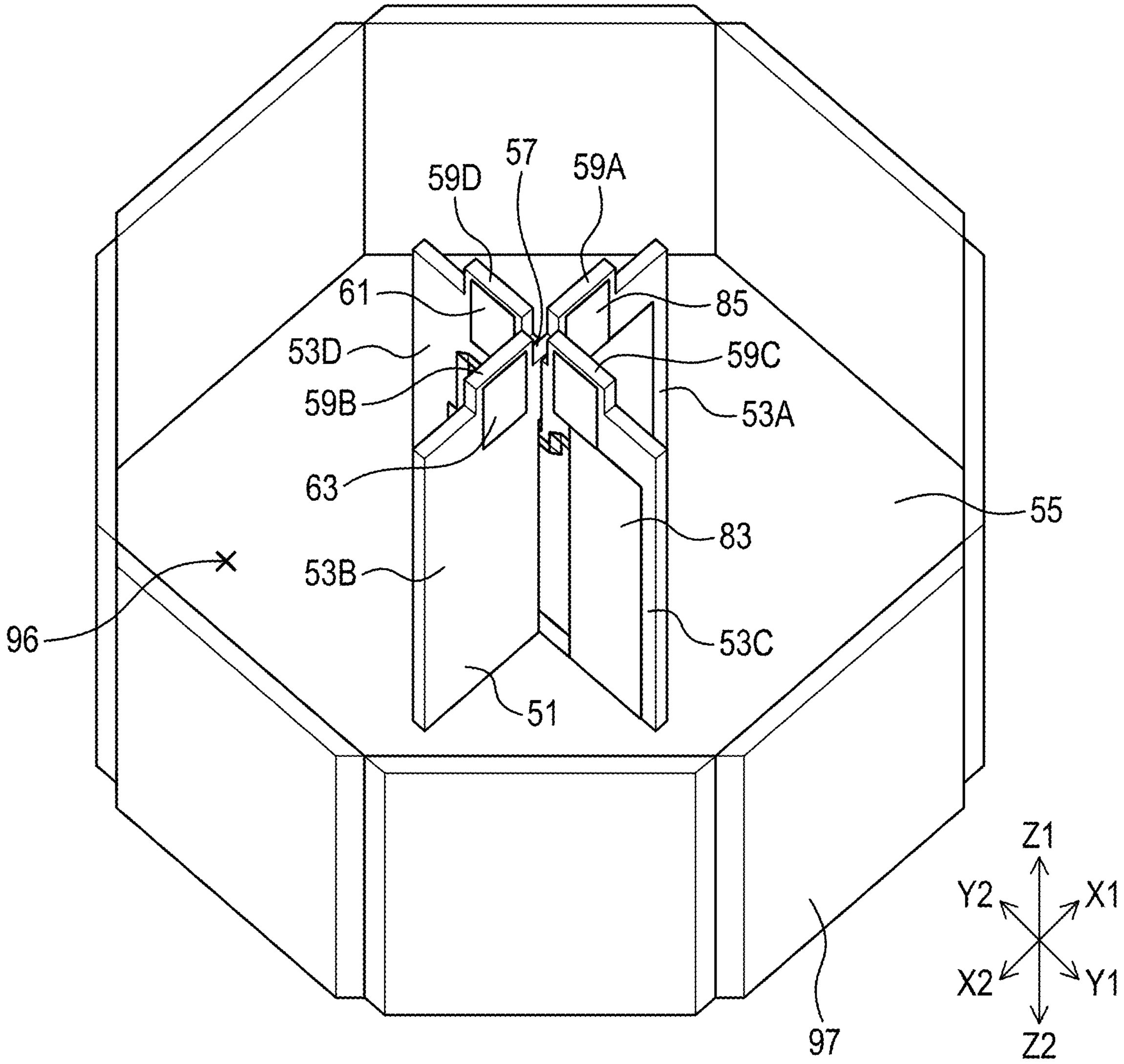
FIG. 5 is a perspective view showing a configuration of the antenna radiating element in a state where the antenna portion is removed.

As shown in FIGS. 5 and 7, the dielectric substrate 51 is provided with a conductor pattern 63 that is continuous. The conductor pattern 63 is a conductor pattern for signal transmission. The conductor pattern 63 reaches the surface of the protrusion portion 59B via the surface of the unit substrate 53A and the surface of the unit substrate 53B.

As shown in FIGS. 5 and 6, the dielectric substrate 51 is provided with a conductor pattern 83 that is continuous. The conductor pattern 83 is a conductor pattern for GND. The conductor pattern 83 reaches the surface of the protrusion portion 59C via the surface of the unit substrate 53C.

As shown in FIG. 6, the dielectric substrate 51 is provided with a conductor pattern 85 that is continuous. The conductor pattern 85 is a conductor pattern for GND. The conductor pattern 85 reaches the surface of the protrusion portion 59A via the surface of the unit substrate 53A.

The conductor pattern 61, the unit substrate 53C, and the conductor pattern 83 constitute a microstrip line. The conductor pattern 61 is a conductor pattern for signal transmission. The conductor pattern 83 is a conductor pattern for GND.

The conductor pattern 63, the unit substrate 53A, and the conductor pattern 85 constitute a microstrip line. The conductor pattern 63 is a conductor pattern for signal transmission. The conductor pattern 85 is a conductor pattern for GND.

The unit substrate 53B and the conductor pattern 63 function as a balance-unbalance converter. The unit substrate 53D and the conductor pattern 61 function as a balance-unbalance converter. The function of the balance-unbalance converter is to maintain balance of equilibrium between the microstrip line that is an unbalanced circuit and the radiating elements 45A, 45B, 45C, and 45D that are balanced circuits, and to suppress generation of common mode noise from the microstrip line.

Figure 8:
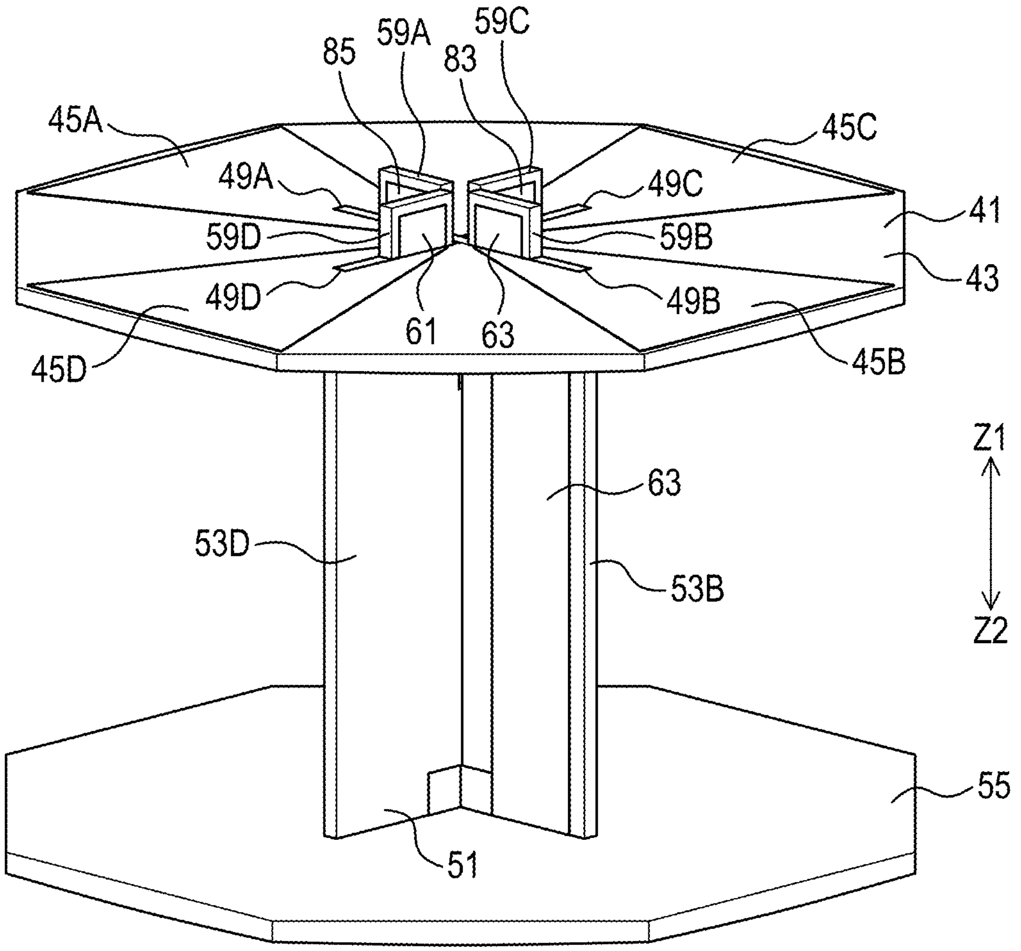
FIG. 8 is a perspective view showing a configuration of the antenna radiating element in a state where a tubular portion is removed.

As shown in FIGS. 2, 3, and 8, the protrusion portion 59A is inserted into the through-hole 49A. The tip of the protrusion portion 59A is on the side of the direction Z1 relative to the antenna portion 41. A part of the conductor pattern 85 formed on the protrusion portion 59A is on the side of the direction Z1 relative to the antenna portion 41. A part formed on the protrusion portion 59A of the conductor pattern 85 is connected to the radiating element 45A by soldering.

As shown in FIGS. 2, 3, and 8, the protrusion portion 59B is inserted into the through-hole 49B. The tip of the protrusion portion 59B is on the side of the direction Z1 relative to the antenna portion 41. A part of the conductor pattern 63 formed on the protrusion portion 59B is on the side of the direction Z1 relative to the antenna portion 41. A part formed on the protrusion portion 59B of the conductor pattern 63 is connected to the radiating element 45B by soldering.

As shown in FIGS. 2, 3, and 8, the protrusion portion 59C is inserted into the through-hole 49C. The tip of the protrusion portion 59C is on the side of the direction Z1 relative to the antenna portion 41. A part of the conductor pattern 83 formed on the protrusion portion 59C is on the side of the direction Z1 relative to the antenna portion 41. A part formed on the protrusion portion 59C of the conductor pattern 83 is connected to the radiating element 45C by soldering.

As shown in FIGS. 2, 3, and 8, the protrusion portion 59D is inserted into the through-hole 49D. The tip of the protrusion portion 59D is on the side of the direction Z1 relative to the antenna portion 41. A part of the conductor pattern 61 formed on the protrusion portion 59D is on the side of the direction Z1 relative to the antenna portion 41. A part formed on the protrusion portion 59D of the conductor pattern 61 is connected to the radiating element 45D by soldering.

As shown in FIGS. 2 to 7, the antenna radiating element 4 includes a tubular portion 97 that is hollow. The axial direction of the tubular portion 97 is parallel to the direction Z1 and the direction Z2. The cross-sectional shape of the tubular portion 97 in a cross section orthogonal to the direction Z1 and the direction Z2 is a regular octagon. A center axis 99 of the tubular portion 97 shown in FIG. 3 is parallel to the direction Z1 and the direction Z2 and passes through the center 47. The center axis 99 is a straight line that passes through the center of the tubular portion 97 in the cross section orthogonal to the direction Z1 and the direction Z2 and that is parallel to the direction Z1 and the direction Z2.

The tubular portion 97 includes an opening portion 96 at an end part on the side of the direction Z1. The outside and the inside of the tubular portion 97 communicate with each other via the opening portion 96. The size of the opening portion 96 is equal to the size of a hole inside the tubular portion 97. An end part on the side of the direction Z2 in the tubular portion 97 is closed by the bottom portion 55. The tubular portion 97 and the bottom portion 55 constitute the reflector 98.

Figure 10:
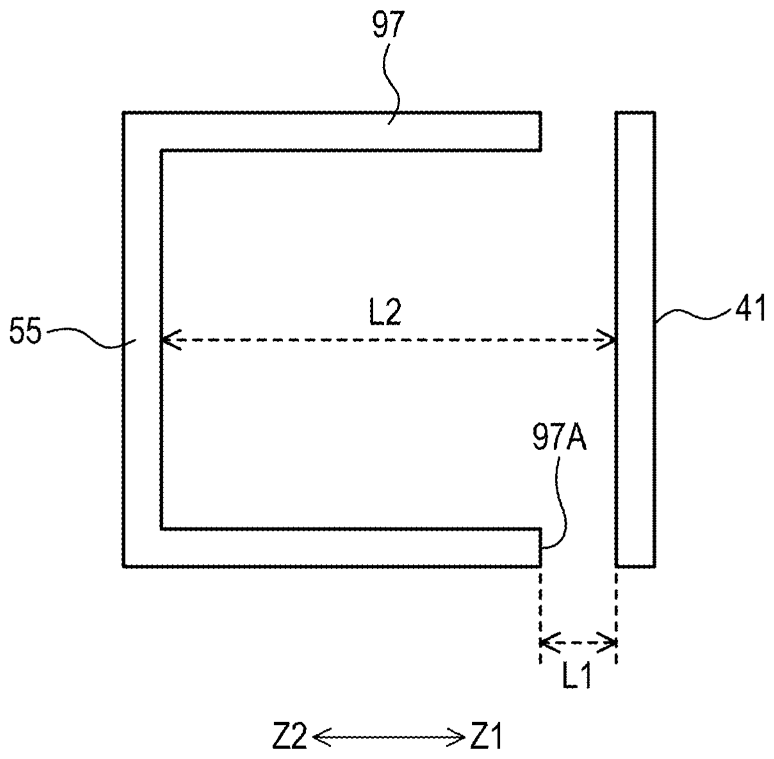
FIG. 10 is an explanatory view showing a position of the antenna portion with respect to a reflector.
Figure 11:
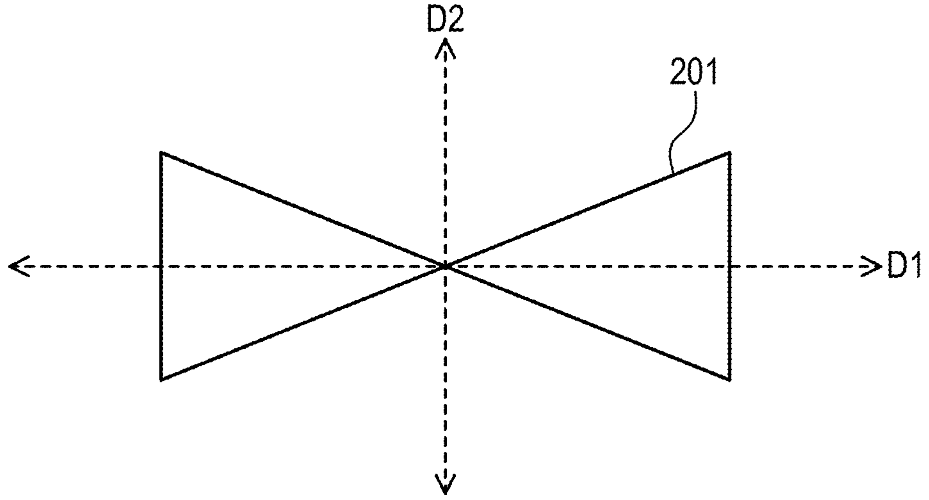
FIG. 11 is an explanatory view showing an element direction and a vertical direction in a bow-tie antenna.

As shown in FIG. 2, the antenna portion 41 is positioned in the vicinity of the opening portion 96 and outside the reflector 98. The antenna portion 41 is on the side of the direction Z1 relative to the opening portion 96. In the direction Z1, a gap exists between the antenna portion 41 and the reflector 98. As shown in FIG. 10, assume that a distance in the direction Z1 between an end part 97A on the side of the direction Z1 in the tubular portion 97 and the antenna portion 41 is L1. L1 is preferably, for example, equal to or greater than $\lambda/10$ and equal to or less than $\lambda/6$. $\lambda$ is a wavelength corresponding to the resonance frequency of the antenna radiating element 4. As shown in FIG. 10, assume that a distance in the direction Z1 between the bottom portion 55 and the antenna portion 41 is L2. L2 is preferably about $\lambda/4$.

As shown in FIGS. 2 and 4 to 7, most of the dielectric substrate 51 is accommodated inside the tubular portion 97. The reflector 98 (i.e., the tubular portion 97 and the bottom portion 55) is a member made of metal such as aluminum, for example.

A radio-frequency signal received by the coaxial cable adapter 25*a* is sent to the radiating element 45D via an intermediate path not shown and the conductor pattern 61. A radio-frequency signal received by the coaxial cable adapter 25*b* is sent to the radiating element 45B via an intermediate path not shown and the conductor pattern 63.

The dielectric substrate 51 can be manufactured by injection molding, for example. The conductor patterns 61, 63, 83, and 85 can be formed by a molded interconnected device (MID) technology, for example.

3. Effects Achieved by Antenna Radiating Element 4

(1A) By including the reflector 98, the antenna radiating element 4 can suppress a deviation of the beam width. The effect of being able to suppress the deviation of the beam width could be confirmed using simulation software (Femlet manufactured by Murata Software Co., Ltd.).

Figure 9:
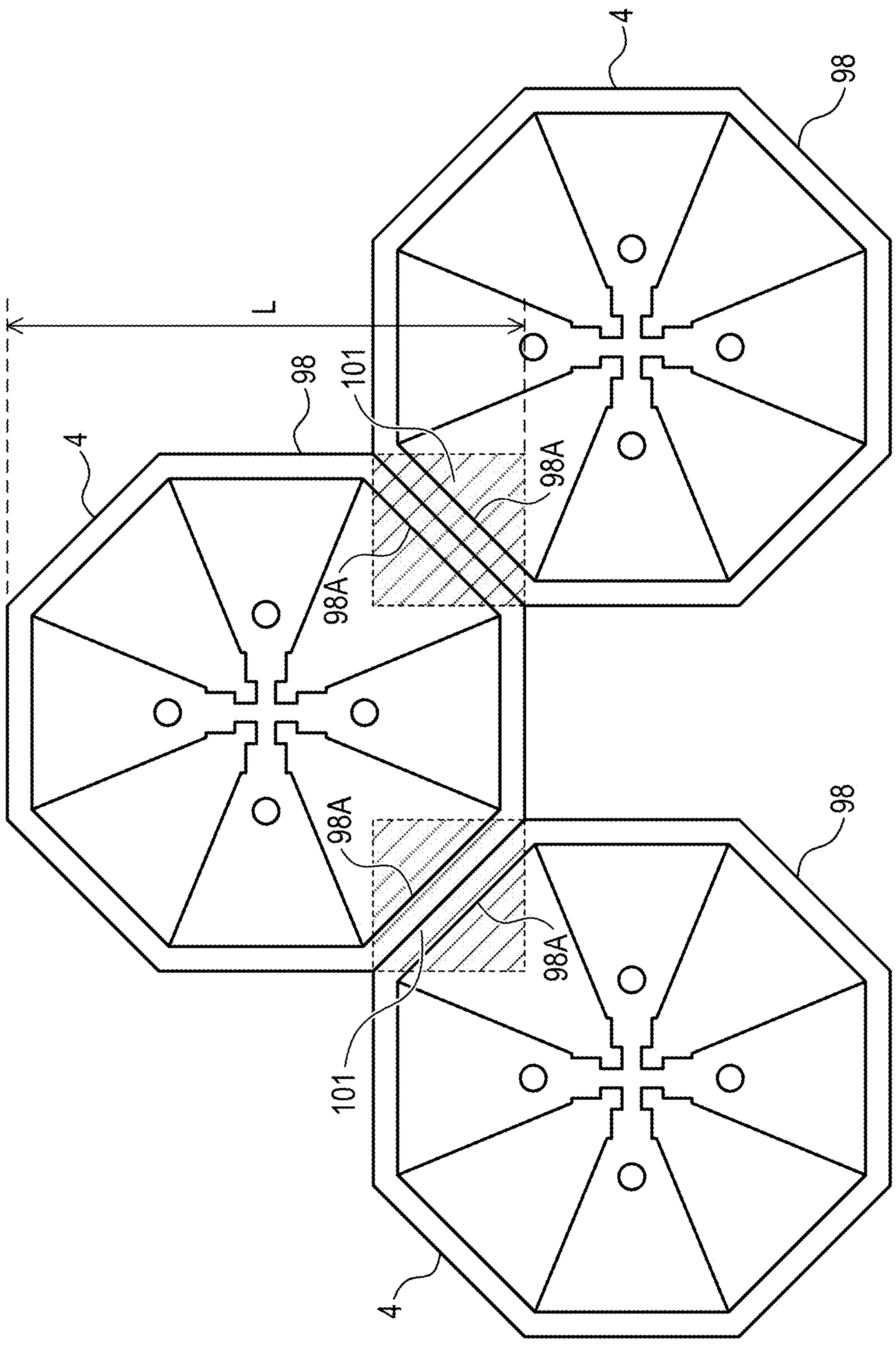
FIG. 9 is an explanatory view showing a state where a plurality of antenna radiating elements are arrayed in a staggered manner.

(1B) The shape of the reflector 98 in a cross section orthogonal to the direction Z1 is a regular octagon. This enables the plurality of antenna radiating elements 4 to be densely arrayed. Densely arraying the antenna radiating elements 4 can downsize the antenna device 1. This effect will be described with reference to FIG. 9. FIG. 9 shows a state where the plurality of antenna radiating elements 4 are arrayed in a staggered manner. The plurality of antenna radiating elements 4 may be arrayed along one straight line as shown in FIG. 1, or may be arrayed in a staggered manner as shown in FIG. 9.

In the cross section orthogonal to the direction Z1, assume that a distance between two opposing sides of the reflector 98 having a regular octagonal shape is L. Assume that each side of the reflector 98 having a regular octagonal shape is 98A. In the state shown in FIG. 9, the sides 98A of the adjacent antenna radiating elements 4 oppose to each other at a short distance.

If the shape of the reflector 98 in the cross section orthogonal to the direction Z1 is a square whose length of one side is L, a corner region 101 shown in FIG. 9 of the reflector 98 is included redundantly in both of the reflectors 98 of the adjacent antenna radiating elements 4. Therefore, the interval between the adjacent antenna radiating elements 4 needs to be larger than the interval shown in FIG. 9. As a result, when the shape of the reflector 98 is a square, the antenna radiating elements 4 cannot be arrayed densely as compared with the case where the shape of the reflector 98 is a regular octagon.

(1C) The shape of the reflector 98 in the cross section orthogonal to the direction Z1 is a regular octagon. Assume that the distance between two opposing sides of the regular octagon is L. In this case, the cross-sectional area of the reflector 98 can be made larger as compared with a case where the shape of the reflector 98 in the cross section orthogonal to the direction Z1 is a circle having a diameter L. This can further suppress the deviation of the beam width.

(1D) The shape of the reflector 98 in the cross section orthogonal to the direction Z1 is a regular octagon. Therefore, as shown in FIG. 9, by making the sides 98A of the regular octagons oppose each other among the plurality of antenna radiating elements 4, it is easy to orderly array the plurality of antenna radiating elements 4. In a case where the shape of the reflector 98 in the cross section orthogonal to the direction Z1 is circular, the side 98A serving as a reference of array does not exist, and therefore it is difficult to orderly array the plurality of antenna radiating elements 4.

(1E) The center axis 99 of the tubular portion 97 passes through an intersection (i.e., the center 47) of the bow-tie antenna 46 and the bow-tie antenna 48. The center axis 99 and the extension direction (i.e., the directions X1 and X2) of the bow-tie antenna 46 are orthogonal to each other. The center axis 99 and the extension direction (i.e., the directions Y1 and Y2) of the bow-tie antenna 48 are orthogonal to each other. Due to this, the effect of the reflector 98 is further enhanced, and the antenna radiating element 4 can further suppress the deviation of the beam width.

Other Embodiments

Although an embodiment of the present disclosure has been described above, the present disclosure is not limited to the above-described embodiment, and can be carried out in various modifications.

(1) In the first embodiment, the reflector 98 may include a body portion made of resin and/or containing resin, and a metal plated layer formed on a surface of the body portion. Also in this case, effects similar to those of the first embodiment can be achieved.

(2) The function of one constituent element in each of the above embodiments may be shared by a plurality of constituent elements, or the function of a plurality of constituent elements may be exerted by one constituent element. A part of the configuration of each of the above embodiments may be omitted. At least a part of the configuration of each of the above embodiments may be added to, replaced with, or the like, the configuration of another of the above embodiments.

(3) In addition to the antenna radiating element 4 described above, the present disclosure can be implemented in various forms such as a system including the antenna radiating element 4 as a constituent element and a manufacturing method of the antenna radiating element 4.

What is claimed is:

1. An antenna radiating element comprising:
an antenna portion including first and second bow-tie antennas arranged in a cross shape; and
a reflector,
wherein:
the reflector includes:
a tubular portion having a cross-sectional shape, which is a regular octagon, in a cross-section orthogonal to an axial direction,
a bottom portion closing one end part in the axial direction of the tubular portion, and
an opening portion provided at an end part opposite to the one end part of the tubular portion,
the antenna portion is positioned in a vicinity of the opening portion and outside of the opening portion such that a gap exists between the antenna portion and the tubular portion of the reflector, a distance in the axial direction between the opposite end part of the tubular portion of the reflector being equal to or greater than $\lambda/10$ and equal to or less than $\lambda/6$, and $\lambda$ is a wavelength corresponding to a resonance frequency of the antenna radiating element.

2. The antenna radiating element according to claim 1, wherein:
a center axis of the tubular portion passes through an intersection of the first and second bow-tie antennas, and
the center axis is orthogonal to extension directions of the first and second bow-tie antennas.

3. The antenna radiating element according to claim 1, wherein the reflector includes:
a body portion made of resin and/or containing resin, and
a metal plated layer formed on a surface of the body portion.

4. An antenna device comprising the antenna radiating element according to claim 1.

5. The antenna radiating element according to claim 2, wherein the reflector includes:
a body portion made of resin and/or containing resin, and
a metal plated layer formed on a surface of the body portion.

6. An antenna device comprising the antenna radiating element according to claim 2.

7. An antenna device comprising a plurality of the antenna radiating elements according to claim 1, wherein:
the plurality of the antenna radiating elements are arrayed in a staggered manner.

8. An antenna device comprising a plurality of the antenna radiating elements according to claim 2, wherein:
the plurality of the antenna radiating elements are arrayed in a staggered manner.

* * * * *